United States Patent
Noguchi et al.

(10) Patent No.: US 6,291,069 B1
(45) Date of Patent: Sep. 18, 2001

(54) ACTIVATED CARBON FOR ELECTRIC DOUBLE LAYER CAPACITOR AND METHOD OF MANUFACTURING SAME

(75) Inventors: Minoru Noguchi; Naohiko Oki; Shigeki Oyama; Kenji Sato, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/134,984

(22) Filed: Aug. 17, 1998

(30) Foreign Application Priority Data

Sep. 1, 1997 (JP) ................................. 9-251357

(51) Int. Cl.[7] ........................................ B32B 9/00
(52) U.S. Cl. ................ 428/408; 428/403; 361/502; 361/301.1; 264/29.6
(58) Field of Search .................... 428/408, 195, 428/403; 361/301.1, 502, 503, 504; 264/29.6, 29.1

(56) References Cited

U.S. PATENT DOCUMENTS

| | | | | |
|---|---|---|---|---|
| 4,737,889 | * | 4/1988 | Nishino et al. | 361/433 |
| 5,381,303 | * | 1/1995 | Yoshida et al. | 361/502 |
| 5,621,607 | * | 4/1997 | Farahmandi et al. | 361/502 |

FOREIGN PATENT DOCUMENTS 61-187322  8/1986 (JP).
9-32-906  12/1997 (JP).

* cited by examiner

*Primary Examiner*—Deborah Jones
*Assistant Examiner*—Wendy Boss
(74) *Attorney, Agent, or Firm*—Arent Fox Kintner Plotkin & Kahn, PLLC

(57) ABSTRACT

Activated carbon for use in an electric double layer capacitor is in the form of particles produced by crushing activated carbon or fibers of activated carbon. The particles have a surface covered at least partly with a laminated structure layer of graphite formed along the surface.

11 Claims, 5 Drawing Sheets

ACTIVATED CARBON FOR ELECTRIC DOUBLE LAYER CAPACITOR AND METHOD OF MANUFACTURING SAME

BACKGROUND OF THE INVENTION

1. Field of the Invention

The present invention relates to activated carbon for use in electric double layer capacitors, and a method of manufacturing such activated carbon.

2. Description of the Related Art

When the surface of a solid comes into contact with an electrolytic solution, positive or negative ions are selectively adsorbed to the surface of the solid, positively or negatively charging the surface of the solid. At the same time, an increased number of oppositely charged paired ions are developed in the electrolytic solution. As a result, positive and negative charges are arranged across the interface between the surface of the solid and the electrolytic solution, thereby making up an electric double layer. It is known in the art that the electric double layer can be used as a capacitor with the solid serving as an electrode. Such a capacitor is called an electric double layer capacitor.

In the electric double layer capacitor, the electrostatic capacitance produced when an electric field is applied to the solid electrode is proportional to the surface area of the solid electrode. Generally, electric double layer capacitors generally use a substance having a large specific surface area, such as activated carbon, as electrodes, and the electrodes is impregnated with an electrolytic solution. The electrodes are separated by a separator, and current collectors are attached to the respective electrodes that are disposed one on each side of the separator.

Electric double layer capacitors find use as backup power supplies for electric devices because they have a large capacitance in farads and exhibit excellent charging and discharging cycle characteristics. Efforts are being made to use electric double layer capacitors as a substitute for vehicle-mounted batteries.

As shown in FIG. 1 of the accompanying drawings, an electric double layer comprises a pair of polarized electrodes 1 made of activated carbon which are positioned to face each other across a separator 2. The polarized electrodes 1 are impregnated with an electrolytic solution containing tetraalkylammonium salt or the like dissolved in an organic solvent. The polarized electrodes 1 with the separator 2 sandwiched therebetween are housed in a casing 3 of aluminum. The casing 3 is closed by a lid 5 of aluminum. The casing 3 and the lid 5 serve as current collectors held in contact with the polarized electrodes 1, respectively. Specifically, each of the polarized electrodes 1 is made of a shaped mixture of particles of activated carbon and a binder of tetrafluoroethylene or the like. Alternatively, each of the polarized electrodes 1 may be made of fibers of activated carbon.

In the illustrated electric double layer capacitor, charges in the polarized electrodes 1 close to the current collectors can easily be collected by the current collectors. However, charges in the polarized electrodes 1 remote from the current collectors are reduced due to the internal resistance of the polarized electrodes 1 before they are collected by the current collectors. Therefore, the electric double layer capacitor has a relatively small effective electrostatic capacitance.

Attempts have been made to improve the internal structure of the particles of activated carbon for reducing the internal resistance of the polarized electrodes 1. For example, some polarized electrodes are made of particles of activated carbon which are mixed with a conductive filler such as of furnace black. According to Japanese laid-open patent publication No. 61-187322, fibers of activated carbon for polarized electrodes have an inner region made of graphite and an outer layer of activated carbon. The inventors of the present invention have proposed to form polarized electrodes of a mixture of particles of activated carbon and a conductive filler by carbonizing an easily graphitizable resin and activating the carbonized resin with an alkali for thereby producing particles of activated carbon, each having a laminated structure of graphite extending inwardly from the surface of the particle (see Japanese patent application No. 8-132050).

However, the improved internal structures of the particles of activated carbon have not been sufficiently effective in reducing the internal resistance of polarized electrodes.

SUMMARY OF THE INVENTION

It is therefore an object of the present invention to provide an activated carbon which will be able to reduce the internal resistance of polarized electrodes of an electric double layer capacitor when the polarized electrodes are made of the activated carbon.

Another object of the present invention is to provide a polarized electrode which is made of such an activated carbon.

Still another object of the present invention is to provide an electric double layer capacitor having polarized electrodes which are made of such an activated carbon.

Yet sill another object of the present invention is to provide a method of manufacturing such an activated carbon.

The inventors have reviewed an internal structure of polarized electrodes of an electric double layer capacitor which comprise particles of activated carbon, a conductive filler, and a binder. As a result of the review, the inventors have found that the conductive filler is disposed around the particles of activated carbon and acts to electrically connect the particles of activated carbon. It has also been found that most of the transfer of electric charges between the particles of activated carbon is effected through the conductive filler.

For reducing the internal resistance of the polarized electrodes, therefore, it is considered more effective to reduce the resistance between the particles of activated carbon than to reduce the resistance of the particles of activated carbon themselves by improving the internal structure of the particles of activated carbon.

The conductive filler is in the form of substantially spherical particles having a diameter of about 200 Å which is about 1/500 of the diameter of the particles of activated carbon. Therefore, the conductive filler is merely held in point-to-point contact with the particles of activated carbon, and has only a small area of contact with the particles of activated carbon. The conductive filler thus fails to provide a sufficient efficiency for electric contact with the particles of activated carbon. The inventors have found it possible to increase the efficiency for electric contact between the conductive filler and the particles of activated carbon and reduce the resistance between the particles of activated carbon by improving the conductivity of the surface of the particles of activated carbon.

According to Japanese patent application No. 8-132050 filed earlier by the inventors, particles of activated carbon have a laminated structure of graphite extending inwardly from the surface of the particles. Since the graphite which is electrically conductive is exposed on the surface of the particles of activated carbon, the conductive filler held in contact with the graphite reduces the resistance between the particles of activated carbon. However, the laminated structure of graphite extending inwardly from the surface of the particles leaves only 10 to 20% of graphite exposed on the surface of the particles. Therefore, much remains to be improved on the disclosed particles of activated carbon.

To achieve the above objects, activated carbon for use in an electric double layer capacitor according to the present invention comprises particles produced by crushing activated carbon or fibers of activated carbon, the particles having a surface covered at least partly with a laminated structure layer of graphite formed along the surface. The laminated structure layer of graphite is a structure of stacked layers each composed of a two-dimensional linkage of six-membered rings of carbon, the layers being joined to each other by the van der Waals force.

The surface of the particles of the activated carbon is covered with the laminated structure layer of graphite which is electrically conductive. Therefore, when the activated carbon according to the present invention is mixed with a conductive filler and a binder, and the mixture is processed into a polarized electrode for an electric double layer capacitor, the conductive filler disposed around the particles of the activated carbon is held in contact with the graphite with high probability for easily transferring electric charges between the particles of the activated carbon.

A polarized electrode for use in an electric double layer capacitor according to the present invention comprises particles of activated carbon having a surface covered at least partly with a laminated structure layer of graphite formed along the surface, a conductive filler, and a binder, the particles of activated carbon, the conductive filler, and the binder being mixed with each other. Because the activated carbon capable of easily transferring electric charges between the particles of the activated carbon is employed, the polarized electrode has a reduced internal resistance.

An electric double layer capacitor according to the present invention comprises a pair of polarized electrodes disposed in confronting relation to each other with a separator interposed therebetween, a pair of current collectors attached respectively to the polarized electrodes, and an electrolytic solution impregnated in the polarized electrodes. Each of the polarized electrodes comprises particles of activated carbon having a surface covered at least partly with a laminated structure layer of graphite formed along the surface, a conductive filler, and a binder, the particles of activated carbon, the conductive filler, and the binder being mixed with each other. Since each of the polarized electrodes is made of the activated carbon capable of easily transferring electric charges between the particles of the activated carbon is employed, the polarized electrode has a reduced internal resistance for allowing electric charges to be easily removed from the electric double layer capacitor. The electric double layer capacitor thus has an increased effective overall electrostatic capacitance. Moreover, inasmuch as electric charges are easily transferred between the particles of the activated carbon, the ability to supply electric energy to the particles of the activated carbon is stabilized when the electric double layer capacitor is charged, and the electrostatic capacitance of the electric double layer capacitor is increased.

The activated carbon for use in the electric double layer capacitor according to the present invention can be manufactured by a method comprising the steps of producing a mesophase pitch by making a mesophase resin infusible through partial oxidization of a surface of the mesophase resin, the mesophase resin being produced by cooling and solidifying a mesophase extracted from a petroleum pitch, carbonizing the mesophase pitch into a carbide by heating the mesophase pitch at a temperature ranging from 500 to 900° C. in a flow of an inactive gas, mixing 1 part by weight of the carbide with 1.2–2.4 parts by weight of alkaline metal hydroxide thereby to produce a mixture, and activating the mixture by heating the mixture at a temperature ranging from 550 to 850° C. in a flow of an inactive gas.

The activated carbon is manufactured from a mesophase pitch. To obtain a mesophase pitch, a mesophase is first extracted from a petroleum pitch, which is a residue produced when crude oil is distilled to produce gasoline, kerosene, etc. The mesophase is a liquid crystal state partly or wholly exhibited by polynuclear-polycyclic aromatic molecules which are grown as carbonization of the petroleum pitch progresses in a liquid phase. When cooled, the mesophase turns into a solid resin. The surface of the resin is partially oxidized to cross-link high-polymer molecules on the surface with oxygen and also to increase the molecular weight to make the resin infusible, thus producing a mesophase pitch.

When the mesophase pitch is carbonized by being heated under the above conditions, the polynuclear-polycyclic aromatic molecules on the infusible region of the surface of the mesophase pitch is converted into graphite. As a result, there is produced a carbide whose surface is covered with a laminated structure layer of graphite.

A carbide having a laminated structure layer of graphite may be produced by carbonizing with heat an easily graphitizable resin such as polyvinyl chloride, tar, or the like. However, since polyvinyl chloride or tar has a low melting point, it melts when heated to 300–400° C. in order to make itself infusible. Consequently, it is necessary to produce activated carbon from a mesophase pitch according to the present invention. An easily graphitizable resin such as polyvinyl chloride, tar, or the like does not lend itself to use in the present invention.

According to the above carbonizing process, hydrogen and side chains are separated from the mesophase pitch, producing a carbide having pores whose diameter is suitable for producing activated carbon as a final product through activation.

Then, the carbide is activated with an alkali under the above conditions. The pores which have been closed by sintering when heated for carbonization are opened, thus producing activated carbon whose surface is covered with a laminated structure layer of graphite.

Since the above method does not use an easily graphitizable resin containing chlorine such as polyvinyl chloride, no chlorine compound is generated at the step of carbonization.

The activated carbon manufactured by the above method is crushed into particles which are used as the material of polarized electrodes of an electric double layer capacitor. The mesophase resin may be melted and spun, and a surface of the spun mesophase may be partially oxidized to produce an infusible fibrous mesophase pitch, which may be carbonized into the carbide. The activated mixture may be crushed into particulate activated carbon. Alternatively, the mesophase may be crushed resin into fine particles, and a surface of the fine particles may be partially oxidized to produce an infusible mesophase pitch.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
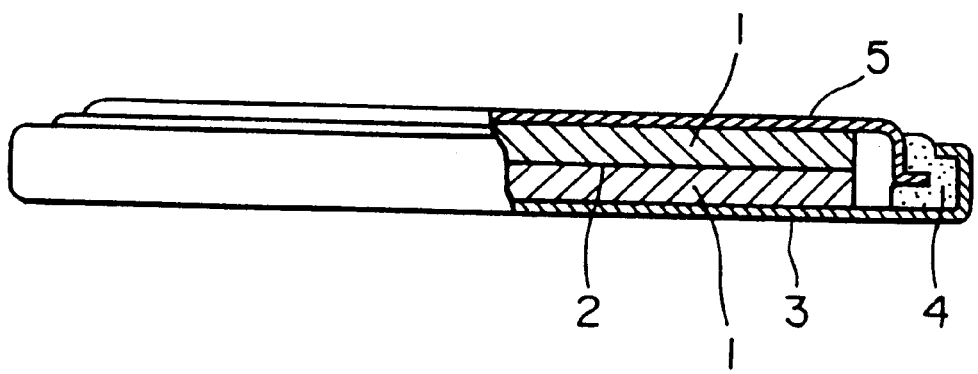
FIG. 1 is a side elevational view, partly in cross section, of an electric double layer capacitor according to the present invention.

As shown in FIG. 1, an electric double layer capacitor according to the present invention comprises a pair of polarized electrodes 1 made of activated carbon which are positioned to face each other across a separator 2. The polarized electrodes 1 are impregnated with an electrolytic solution containing tetraalkylammonium salt or the like dissolved in an organic solvent. The polarized electrodes 1 with the separator 2 sandwiched therebetween are housed in a casing 3 of aluminum. The casing 3 is closed by a lid 5 of aluminum with a gasket 4 interposed between their circumferential edges. The casing 3 and the lid 5 serve as current collectors held in contact with the polarized electrodes 1, respectively. The casing 3 and the lid 5 double as terminals for connection to an external circuit (not shown).

Each of the polarized electrodes 1 is made of a shaped mixture of particles of activated carbon whose surfaces are covered with a laminated structure layer of graphite, a conductive filler of furnace black or the like, and a binder of tetrafluoroethylene or the like.

A process of manufacturing the particles of activated carbon will be described below.

First, a mesophase is extracted from a petroleum pitch which is a residue produced when crude oil is distilled, and then cooled into a solid mesophase resin. The solid mesophase resin is melted by being heated to a temperature higher than its melting point, and spun into fibers. The fibers are then heated to a temperature ranging from 350 to 400° C., into a fibrous mesophase pitch whose surface has been made infusible by oxidization. One such fibrous mesophase pitch is sold by Petka Corp.

In this embodiment, the mesophase pitch is carbonized by being heated, and the carbonized mesophase pitch is activated with an alkali into fibers of activated carbon, which are crushed into fine particles. Alternatively, the solid mesophase resin referred to above may be crushed into fine particles, which may be made infusible, carbonized, and then activated with an alkali.

The mesophase pitch is carbonized by being heated to a temperature ranging from 500 to 900° C., preferably from 500 to 800° C., in a flow of an inactive gas such as a nitrogen gas. When heated, hydrogen and side chains are separated from the mesophase pitch, producing a carbide with only a carbon skeleton left. If the temperature at which the mesophase pitch is heated were lower than 500° C., the mesophase pitch would not be carbonized easily, and if the mesophase pitch thus heated were used as polarized electrodes of an electric double layer capacitor, the electrostatic capacitance of the electric double layer capacitor would be degraded greatly. If the temperature at which the mesophase pitch is heated were higher than 900° C., the diameter of pores in the carbide would be too large for the mesophase pitch to be used as polarized electrodes of an electric double layer capacitor.

When the temperature at which the mesophase pitch is heated exceeds 800° C., then the carbon skeleton of the produced carbide is so firm that stricter conditions including a higher temperature and a greater amount of alkaline metal hydroxide will be necessary for alkaline activation of the carbide. When the carbide is activated under such stricter conditions, a furnace used for the heating the carbide is damaged, and the furnace material tends to be mixed with the activated carbon. Therefore, the mesophase pitch should preferably be carbonized by being heated to a temperature ranging from 500 to 800° C.

Unless the mesophase pitch were carbonized in a flow of an inactive gas, the carbon skeleton would be oxidized and would not be converted into a carbide.

The carbide is activated by mixing 1 part by weight of the carbide with 1.2 to 2.4 parts by weight, preferably 1.2 to 2.2 parts by weight, of potassium hydroxide and heating the mixture to a temperature ranging from 550 to 850° C. in a flow of an inactive gas such as of nitrogen. When thus heated, pores having a diameter suitable for producing activated carbon as a final product are developed in the mixture. The carbide may be activated using alkaline metal hydroxides other than potassium hydroxide, such as sodium hydroxide, lithium hydroxide, or the like. It is preferable, however, to use potassium hydroxide because it is relatively inexpensive. If less than 1.2 parts by weight of potassium hydroxide were added to 1 part by weight of the carbide, then the pores would not have a sufficiently large diameter. If more than 2.4 parts by weight of potassium hydroxide were added to 1 part by weight of the carbide, then the pores would be so large that the electrostatic capacitance per unit volume would be reduced.

If more than 2.2 parts by weight of potassium hydroxide are added to 1 part by weight of the carbide, then the pores tend to become so large that the electrostatic capacitance per unit volume will be reduced, and the yield of activated carbon tends to be reduced. Therefore, it is preferable that 1 part by weight of the carbide be mixed with 1.2 to 2.2 parts by weight of potassium hydroxide.

If the mixture were heated at a temperature lower than 550° c., then the pores in the produced activated carbon would not have a sufficiently large diameter. When the produced activate carbon were used as the material of the polarized electrodes, the pores would be clogged, and the electrostatic capacitance would be lowered in use over a long period of time. If the mixture were heated at a temperature higher than 850° c., then the pores in the produced activated carbon would be excessively large, resulting in a reduction in the electrostatic capacitance per unit volume. In addition, a furnace used for the heating the mixture would be damaged, and the furnace material would tend to be mixed with the activated carbon.

Unless the mixture were heated in a flow of an inactive gas such as of nitrogen, the carbide would be oxidized, failing to produce desired activated carbon.

Examples of the present invention will be described below.

INVENTIVE EXAMPLE 1

A mesophase resin obtained from a petroleum pitch was melted and spun, and made infusible into a fibrous mesophase pitch (manufactured by Petka Corp.). The fibrous mesophase pitch was then heated into a carbide at a temperature of 650° C. for 1 hour in a flow of a nitrogen gas. 1.6 parts by weight of potassium hydroxide were mixed with 1 part by weight of the carbide, and the mixture was activated by being heated at 800° C. for 5 hours in a flow of a nitrogen gas, producing fibers of activated carbon. The produced activated carbon fibers were crushed into fine particles.

Figure 2:
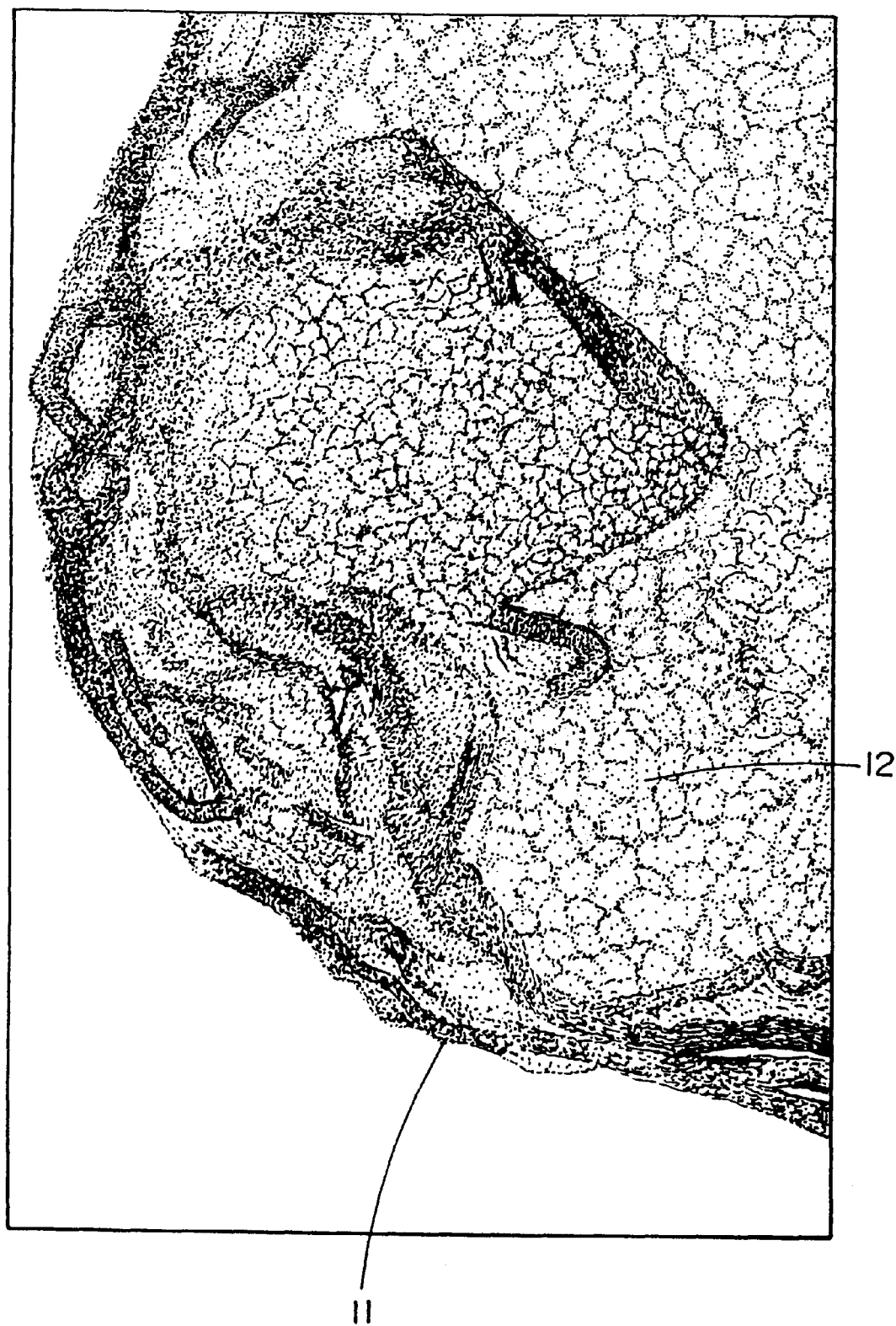
FIG. 2 is an electron microscopic photographic representation of a particle structure of activated carbon according to the present invention.

An electron microscopic photographic representation of a particle structure of the activated carbon thus produced is shown in FIG. 2. As shown in FIG. 2, a striped region 11 represents a laminated structure layer of graphite. It can be seen that the activated carbon, denoted by 12 in FIG. 2, is uniformly covered with the laminated structure layer of graphite.

The activated carbon was then mixed with furnace black (manufactured by Denki Kagaku Kogyo K.K. under tradename: Denka Black) as a conductive filler and a binder. The mixture was shaped under pressure into the polarized electrodes 1 shown in FIG. 1.

There were produced four pairs of polarized electrodes 1. In the respective pairs, the activated carbon, the conductive filler, and the binder were mixed at weight ratios of 86:9:5, 90:5:5, 93:2:5, and 95:0:5, respectively. The polarized electrodes 1 in each pair were attached to respective opposite sides of a glass filter (manufactured by ADVATEC under tradename: GA-100) as the separator 2, and then placed in the casing 3. A solution of propylene carbonate containing 1 mol/liter of tetraethylammonium tetrafluoroborate ($[(C_2H_5)_4N]^+BF_4^-$) was poured as an electrolyte, after which the casing 3 was closed by the lid 5. In this manner, four electric double layer capacitors were produced.

Figure 4:
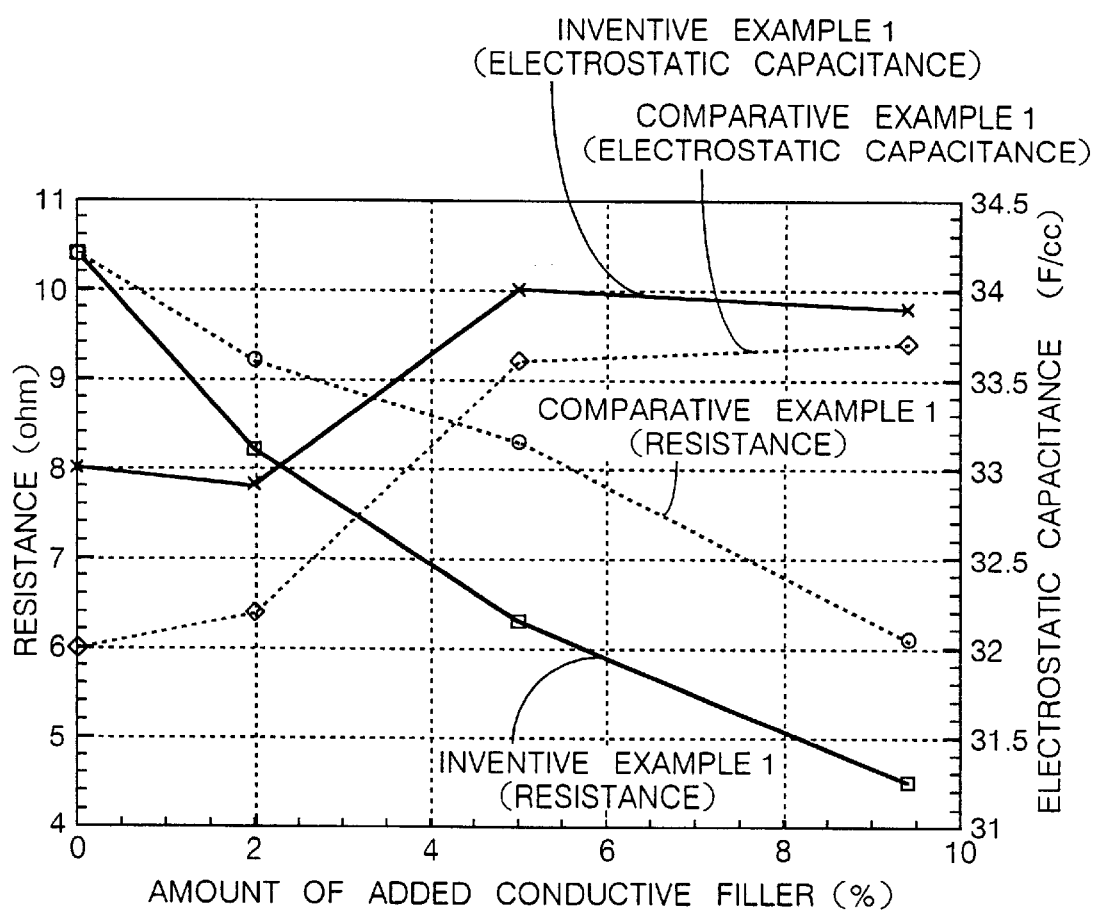
FIG. 4 is a graph showing internal resistances and electrostatic capacitances of polarized electrodes according to Inventive and Comparative Examples.

The four electric double layer capacitors were measured for an internal resistance and an electrostatic capacitance per unit volume of the polarized electrodes 1. The measured values are shown in FIG. 4.

COMPARATIVE EXAMPLE 1

A polyvinyl chloride resin was heated into a carbide at a temperature of 650° C. for 1 hour in a flow of a nitrogen gas. 1.6 parts by weight of potassium hydroxide were mixed with 1 part by weight of the carbide, and the mixture was activated by being heated at 800° C. for 5 hours in a flow of a nitrogen gas, producing activated carbon.

Figure 3:
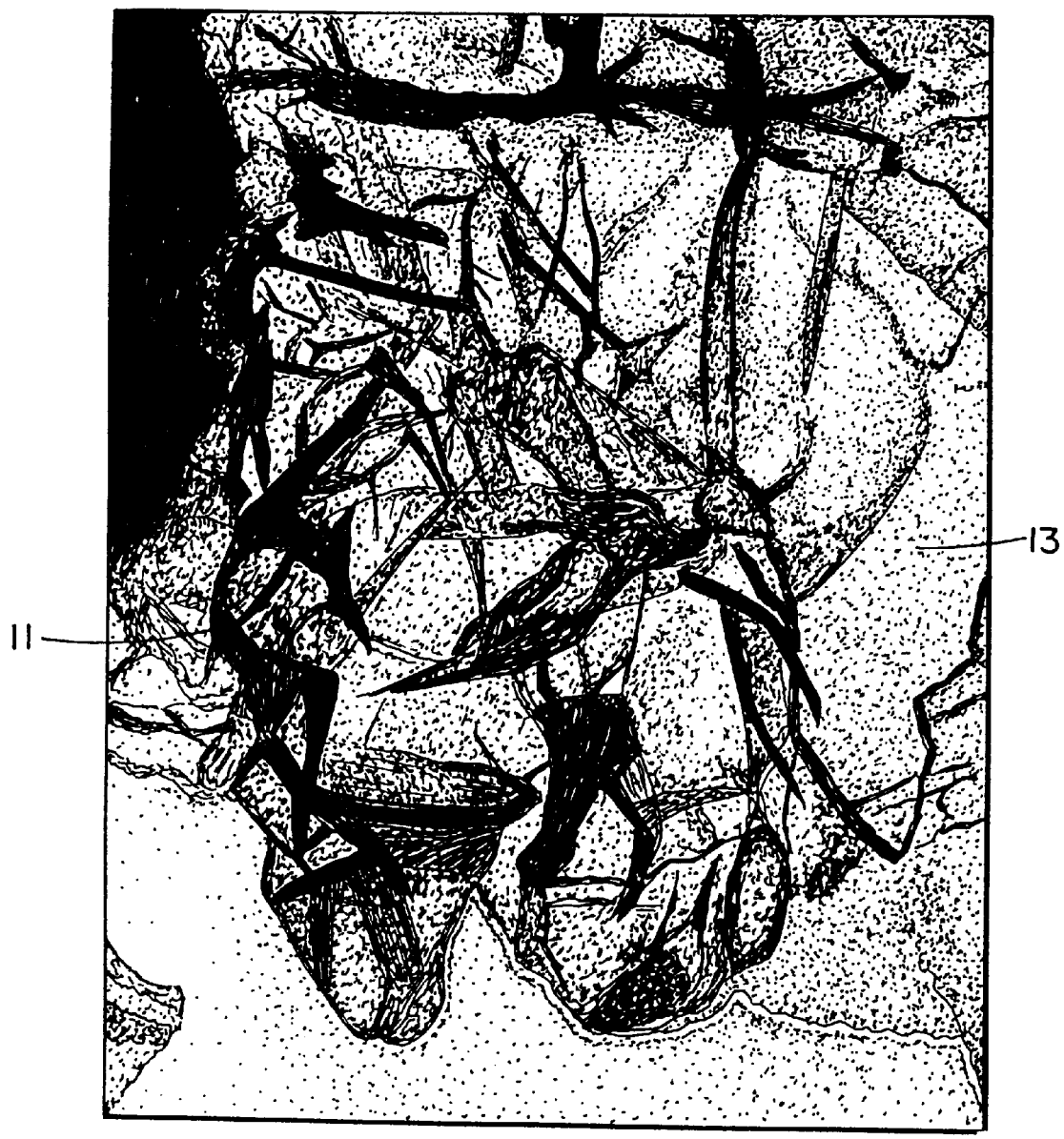
FIG. 3 is an electron microscopic photographic representation of a particle structure of conventional activated carbon.

An electron microscopic photographic representation of a particle structure of the activated carbon thus produced is shown in FIG. 3. As shown in FIG. 3, a striped region 11 represents a laminated structure layer of graphite. It can be seen that laminated structure layer 11 of graphite extends inwardly from the surface of the activated carbon, denoted by 13 in FIG. 3, and less graphite is exposed on the surface of the activated carbon 13.

There were produced four pairs of polarized electrodes 1 in the same manner as with Inventive Example 1 except that the above activated carbon was used. In the respective pairs, the activated carbon, the conductive filler, and the binder were mixed at weight ratios of 86:9:5, 90:5:5, 93:2:5, and 95:0:5, respectively. Using the polarized electrodes 1 thus formed, four electric double layer capacitors were produced in the same manner as with Inventive Example 1.

The four electric double layer capacitors were measured for an internal resistance and an electrostatic capacitance per unit volume of the polarized electrodes 1. The measured values are shown in FIG. 4.

It will be understood from FIG. 4 that if the amount of the conductive filler is the same, the polarized electrodes 1 using the activated carbon according to Inventive Example 1 exhibited a smaller internal resistance than the polarized electrodes 1 using the activated carbon according to Comparative Example 1, and this tendency manifests itself more as the amount of the conductive filler is greater. It can also be seen that if the amount of the conductive filler is the same, the polarized electrodes 1 using the activated carbon according to Inventive Example 1 exhibited a greater electrostatic capacitance than the polarized electrodes 1 using the activated carbon according to Comparative Example 1. It follows from these observations that the electric conductivity of the surfaces of the particles of the activated carbon according to Inventive Example 1 was improved.

INVENTIVE EXAMPLE 2

A mesophase resin obtained from a petroleum pitch was melted and spun, and made infusible into a fibrous mesophase pitch (manufactured by Petka Corp.). Seven samples of the fibrous mesophase pitch were then heated into carbides at respective temperatures of 500° C., 600° C., 700° C., 750° C., 800° C., 850° C., and 900° C. for 1 hour. 1.6 parts by weight of potassium hydroxide were mixed with 1 part by weight of each of the carbides, producing 4 mixtures of each sample. The mixtures were activated by being heated at 550° C., 650° C., 750° C., and 800° C. for 5 hours in a flow of a nitrogen gas, producing 28 samples of fibers of activated carbon. The produced activated carbon fibers were crushed into fine particles.

The activated carbon of each sample was then mixed with furnace black (manufactured by Denki Kagaku Kogyo K.K. under tradename: Denka Black) as a conductive filler and a binder at a weight ratio of 85:10:5 (activated carbon/conductive filler/binder). The mixture was shaped under pressure into the polarized electrodes 1 shown in FIG. 1, thus producing 28 electric double layer capacitors in the same manner as with Inventive Example 1.

Then, the electric double layer capacitors were charged and discharged, and measured for an electrostatic capacitance per unit volume of the polarized electrodes 1. The measured values are shown in FIG. 5.

Figure 5:
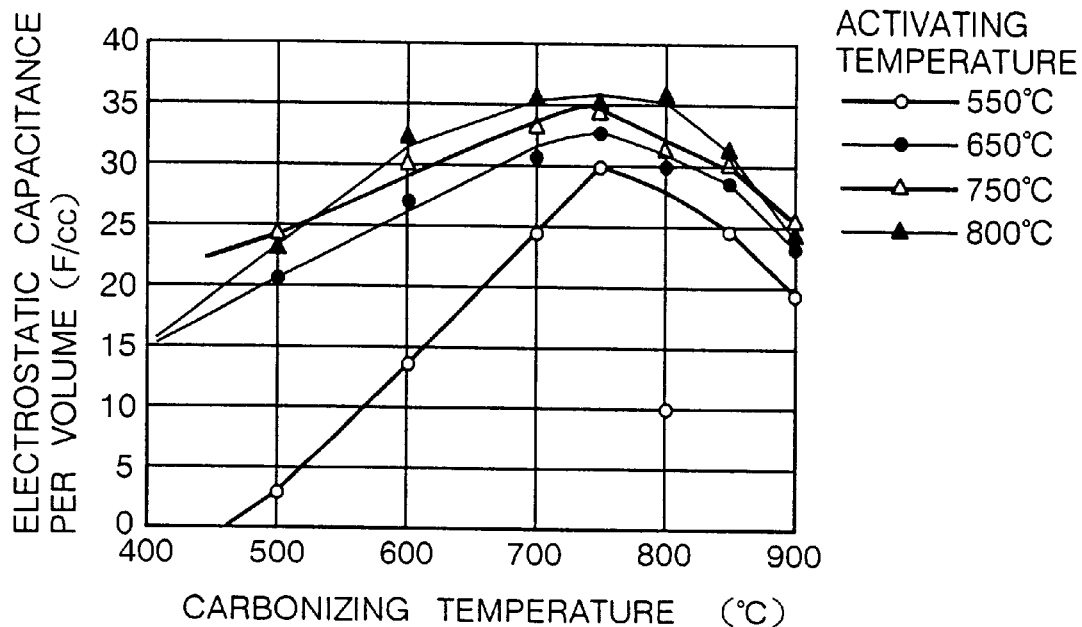
FIG. 5 is a graph showing the relationship between carbonizing temperatures of activated carbon according to the present invention and electrostatic capacitances per unit volume of polarized electrodes made of the activated carbon according to the present invention.

A review of FIG. 5 indicates that the activated carbons carbonized in a temperature range from 500 to 900° C. and activated in a temperature range from 550 to 800° C. exhibited an electrostatic capacitance per unit volume expressed in farads.

Of the 28 electric double layer capacitors, the six electric double layer capacitors using the activated carbons carbonized at the temperatures of 500° C., 600° C., 700° C., 750° C., 800° C., and 850° C. and activated at the temperature of 800° C. were repeatedly charged and discharged at 3.5 V for 100 cycles, and then measured for the ratio of a maintained electrostatic capacitance to an initial electrostatic capacitance. The measured values are shown in Table 1 below.

TABLE 1

| Carbonizing temperature (° C.) | Ratio of maintained electrostatic capacitance to initial electrostatic capacitance (%) |
|---|---|
| 500 | 71.4 |
| 600 | 81.4 |
| 700 | 87.9 |
| 750 | 88.1 |
| 800 | 89.2 |
| 850 | 88.3 |

It will be understood from Table 1 that as the carbonizing temperature becomes lower from 700° C. to 600° C. to 500° C., the ratio of the maintained electrostatic capacitance to the initial electrostatic capacitance is lowered. When the carbonizing temperature is lower than 500° C., the ratio of the maintained electrostatic capacitance to the initial electrostatic capacitance is further reduced, greatly detriorating the electrostatic capacitance.

INVENTIVE EXAMPLE 3

A mesophase resin obtained from a petroleum pitch was melted and spun, and made infusible into a fibrous mesophase pitch (manufactured by Petka Corp.). Six samples of the fibrous mesophase pitch were then heated into carbides at respective temperatures of 500° C., 600° C., 700° C., 750° C., 800° C., and 850° C. for 1 hour. 1.2, 1.4, 1.6, 1.8, and 2.0 parts by weight of potassium hydroxide were mixed with 1 part by weight of the carbide carbonized at 500° C., and 1.2, 1.4, 1.6, 1.8, 2.0, 2.2, and 2.4 parts by weight of potassium hydroxide were mixed with 1 part by weight of the other carbides, producing 40 mixtures. The mixtures were activated by being heated at 800° C. for 5 hours in a flow of a nitrogen gas, producing 40 samples of fibers of activated carbon. The produced activated carbon fibers were crushed into fine particles.

The activated carbon of each sample was then mixed with furnace black (manufactured by Denki Kagaku Kogyo K.K. under tradename: Denka Black) as a conductive filler and a binder at a weight ratio of 85:10:5 (activated carbon/conductive filler/binder). The mixture was shaped under pressure into the polarized electrodes 1 shown in FIG. 1, thus producing 40 electric double layer capacitors in the same manner as with Inventive Example 1.

Then, the electric double layer capacitors were charged and discharged, and measured for an electrostatic capacitance per unit volume of the polarized electrodes 1. The measured values are shown in FIG. 6.

Figure 6:
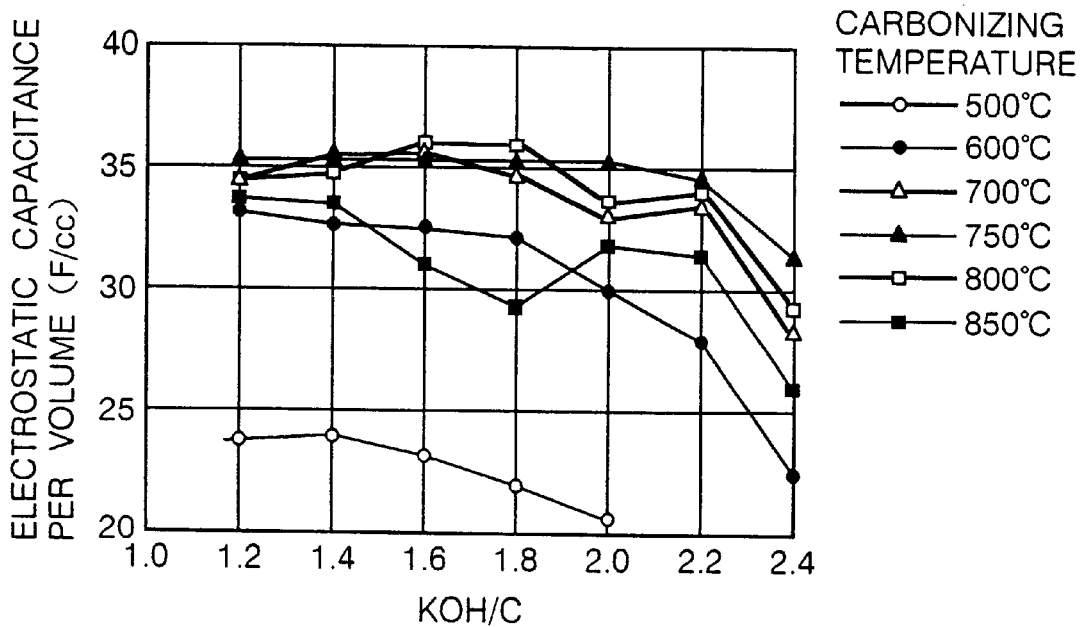
FIG. 6 is a graph showing the relationship between amounts of alkaline metal hydroxide used for alkaline activation of activated carbon according to the present invention and electrostatic capacitances per unit volume of polarized electrodes made of the activated carbon according to the present invention.

A review of FIG. 6 indicates that the activated carbons carbonized in a temperature range from 500 to 850° C. and activated with 1.2–2.4 parts by weight of potassium hydroxide added to 1 part by weight of the carbide exhibited an electrostatic capacitance per unit volume expressed in farads.

1.2, 1.4, 1.6, 2.0, 2.2, and 2.4 parts by weight of potassium hydroxide were mixed with 1 part by weight of the activated carbon carbonized at 600° C., and the mixtures were activated by being heated at 800° C. for 5 hours in a flow of a nitrogen gas. The yields of the produced activated carbons are shown in Table 2 below.

TABLE 2

| KOH (part by weight) | Activated carbon yield (%) |
|---|---|
| 1.2 | 78.4 |
| 1.4 | 73.2 |
| 1.6 | 67.6 |
| 1.8 | 65.7 |
| 2.0 | 63.7 |
| 2.2 | 56.6 |
| 2.4 | 47.1 |

It can be seen from Table 2 that as the amount of potassium hydroxide mixed with 1 part by weight of the carbide increases, the yield of the activated carbon decreases. When the amount of potassium hydroxide mixed with 1 part by weight of the carbide is greater than 2.4 parts by weight, the yield of the activated carbon further decreases.

Although a certain preferred embodiment of the present invention has been shown and described in detail, it should be understood that various changes and modifications may be made therein without departing from the scope of the appended claims.

What is claimed is:

1. Activated carbon for use in an electric double layer capacitor, comprising particles produced by crushing activated carbon or fibers of activated carbon, said particles having a surface covered at least partly with a laminated structure layer of graphite formed along the surface.

2. A polarized electrode for use in an electric double layer capacitor, comprising:
   particles of activated carbon having a surface covered at least partly with a laminated structure layer of graphite formed along the surface;
   a conductive filler; and
   a binder;
   said particles of activated carbon, said conductive filler, and said binder being mixed with each other.

3. An electric double layer capacitor comprising:
   a pair of polarized electrodes disposed in confronting relation to each other with a separator interposed therebetween;
   a pair of current collectors attached respectively to said polarized electrodes; and
   an electrolytic solution impregnated in said polarized electrodes;
   each of said polarized electrodes comprising particles of activated carbon having a surface covered at least partly with a laminated structure layer of graphite formed along the surface, a conductive filler, and a binder, said particles of activated carbon, said conductive filler, and said binder being mixed with each other.

4. A method of manufacturing activated carbon in accordance with claim 1 for use in an electric double layer capacitor, comprising the steps of:
   producing a mesophase pitch by making a mesophase resin infusible through partial oxidization of a surface of the mesophase resin, said mesophase resin being produced by cooling and solidifying a mesophase extracted from a petroleum pitch;
   carbonizing said mesophase pitch into a carbide by heating the mesophase pitch at a temperature ranging from 500 to 900° C. in a flow of an inactive gas;
   mixing 1 part by weight of said carbide with 1.2–2.4 parts by weight of alkaline metal hydroxide thereby to produce a mixture; and activating said mixture by heating the mixture at a temperature ranging from 550 to 850° C. in a flow of an inactive gas.

5. A method according to claim 4, wherein said step of producing a mesophase pitch comprises the steps of melting and spinning said mesophase resin, and partially oxidizing a surface of the spun mesophase resin to produce an infusible fibrous mesophase pitch, said step of carbonizing said mesophase pitch comprises the step of carbonizing said infusible fibrous mesophase pitch into said carbide, further comprising the step of crushing the activated mixture into particulate activated carbon.

6. A method according to claim 4, wherein said step of producing a mesophase pitch comprises the steps of crushing said mesophase resin into fine particles, and partially oxidizing a surface of the fine particles to produce an infusible mesophase pitch.

7. A method according to claim 4, wherein said petroleum pitch comprises a residue produced when crude oil is distilled.

8. A method according to claim 4, wherein said inactive gas comprises a nitrogen gas.

9. A method according to claim 4, wherein said step of carbonizing said mesophase pitch comprises the step of heating said mesophase pitch at a temperature ranging from 500 to 800° C. in the flow of the inactive gas.

10. A method according to claim 4, wherein said step of mixing comprises the step of mixing 1 part by weight of said carbide with 1.2–2.2 parts by weight of alkaline metal hydroxide thereby to produce said mixture.

11. A method according to claim 4, wherein said alkaline metal hydroxide comprises potassium hydroxide.

* * * * *